United States Patent
Lin et al.

(10) Patent No.: US 9,061,451 B2
(45) Date of Patent: Jun. 23, 2015

(54) QUICK-DRYING PRINT AND ENVIRONMENTAL-FRIENDLY BIAXIALLY ORIENTATED POLYPROPYLENE SYNTHETIC PAPER

(75) Inventors: Allen F. C. Lin, Taipei (TW); Hong Kuo Cheng, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 516 days.

(21) Appl. No.: 13/614,135

(22) Filed: Sep. 13, 2012

(65) Prior Publication Data

US 2014/0070464 A1    Mar. 13, 2014

(51) Int. Cl.

| | |
|---|---|
| *B29C 47/06* | (2006.01) |
| *B29C 55/02* | (2006.01) |
| *B29C 55/14* | (2006.01) |
| *B41M 5/00* | (2006.01) |
| *B41M 5/50* | (2006.01) |
| *B29C 47/56* | (2006.01) |
| *B29C 47/00* | (2006.01) |
| *B29C 71/02* | (2006.01) |
| *B29K 23/00* | (2006.01) |

(52) U.S. Cl.
CPC .............. *B29C 47/06* (2013.01); *B29K 2023/10* (2013.01); *B29C 55/023* (2013.01); *B29C 55/143* (2013.01); *B41M 5/0011* (2013.01); *B41M 5/502* (2013.01); *B29C 47/56* (2013.01); *B29C 47/0004* (2013.01); *B29C 47/0057* (2013.01); *B29C 47/065* (2013.01); *B29K 2023/12* (2013.01); *B29C 71/02* (2013.01); *B29C 2071/022* (2013.01)

(58) Field of Classification Search
CPC .... B29C 47/0057; B29C 47/06; B29C 47/065
See application file for complete search history.

(56) References Cited

U.S. PATENT DOCUMENTS

| | | | | |
|---|---|---|---|---|
| 5,667,872 | A | * | 9/1997 | Ohno et al. .................... 428/141 |
| 6,001,290 | A | | 12/1999 | Lin |
| 6,364,988 | B1 | | 4/2002 | Lin |
| 6,790,491 | B2 | * | 9/2004 | Sebastian et al. ........... 428/32.23 |
| 2008/0280113 | A1 | * | 11/2008 | Iwatani et al. ................ 428/206 |

FOREIGN PATENT DOCUMENTS

| | | |
|---|---|---|
| EP | 0888866 B1 | 7/1999 |
| JP | 1971040794 B | 12/1971 |
| JP | 1975161478 A | 12/1975 |

(Continued)

*Primary Examiner* — James Sanders
(74) *Attorney, Agent, or Firm* — Ming Chow; Sinorica, LLC

(57) ABSTRACT

A quick-drying print and environmental-friendly biaxially orientated polypropylene synthetic paper is produced from a polypropylene resin composition comprising a high crystalline polypropylene resin, calcium carbonate composite particles, titanium dioxide composite particles, antistatic agents, UV absorbers and anti-blocking agent, which are fed into one twin-screw primary extruder and two twin-screw secondary extruders respectively, convergently flowed through the same T-die, co-extruded into a three-layer structure substrate film, after cooling and setting, this film is first longitudinally orientated, then laterally orientated; thereafter the three-layer film is high-frequency corona treated and winded up to gain the film having thickness less than 250 μm. At the end the three-layer film is coated a thickness below 10 μm with a water-based paper-like surface processing agent containing acrylic resin, calcium carbonate, clay, titanium dioxide, water, antistatic agent via a gravure coating roller to acquire an improved synthetic paper having a better printability.

1 Claim, 2 Drawing Sheets

(56) References Cited

FOREIGN PATENT DOCUMENTS

| JP | 1981118437 A | 9/1981 |
| JP | 1981141339 A | 11/1981 |
| JP | 1991087255 A | 4/1991 |
| JP | 11198313 A | 7/1999 |

* cited by examiner

QUICK-DRYING PRINT AND ENVIRONMENTAL-FRIENDLY BIAXIALLY ORIENTATED POLYPROPYLENE SYNTHETIC PAPER

FIELD OF THE INVENTION

The present invention relates to a quick-drying print and environmental-friendly biaxially orientated polypropylene (BOPP) synthetic paper, in particular, aims at that two different polypropylene resin composite materials, processed with one twin-screw primary extruder and two twin-screw secondary extruders respectively and then co-extruded through the same T-die to prepare a substrate film with a three-layer structure, through cooling and setting, biaxial orientation, and then coated with a non-toxic water-based primer, finally coated with a paper-like surface processing agent to become a polypropylene synthetic paper.

BACKGROUND OF THE INVENTION

To replace the natural white paper, a polyolefin synthetic paper based on polypropylene biaxially orientated film as the intermediate substrate layer, with its surface being laminated or coated with uniaxially oritated polypropylene films comprising inorganic salt fine powder as a paper-like surface has long been developed by Japan Yupo Corporation, and filed a patent (Japanese Patent No. 46-40794, Japanese Publication No. 56-141339 and Japanese Publication No. 56-118437), and commercialized. To improve the gravure printability of synthetic papers, Japanese Publication No. 50-10624, and Japanese Publication No. 50-161478 etc., discloses to coat 0.005~0.1 g/m² of acrylic copolymer or polyethylene imine solution on the synthetic paper surface; besides, Japanese Japanese Publication No. 3-87255 discloses that 35~95% by weight of crystalline polypropylene with isotacticity above 98% and 65~5% by weight of talc and/or mica powder are extruded and bi-axially orientated as a substrate layer (middle layer), and on at least one side of this substrate layer is laminated or coated another thin surface layer which is produced from an uniaxial orientation of a resin containing 20~90% by weight of high crystalline polypropylene with 98% isotacticity and 80~10% by weight of inorganic salt fine powder to constitute a composite resin synthetic paper with opacity more than 90%.

The synthetic papers of above Japanese Patent Publications show advantages of waterproof, tear resistance, rigidity, mechanical strength and adhesion to the printing head, however, the ink drying rate in the printing process is not so ideal that they are not widely applicable in writing and printing cultural paper. The reason is that the microvoid volume and the porosity connection degree of the synthetic paper are much less ideal than those of natural papers, resulting in that the ink drying time is quite long (4-color printing takes about 8 hours) after the printing process, it is inevitable to dry the ink on synthetic paper, also the amount of stacking is limited for preventing undesired reverse printing. As for the four-color double-sided printing, the number of printing operators is potentially needed to increase, besides, the working space to wait for drying is necessary, and because the polypropylene uniaxially orientated film structure containing inorganic salt fine powder exhibits worse ink adhesion amount than that of the natural paper, more ink should be put into the printing machine to achieve the color saturation; meanwhile, an unique printing ink at a 3-4 more times expensive price than that of the natural paper printing ink is needed to prevent the intrusion of the ink solvent resulting in paper deformation and dimensional change. In other words, the main reason that the synthetic paper of the polypropylene uniaxially orientated film structure containing inorganic salt fine powder can not widely replace the natural paper products in many applications is the long printing process and cost difference as compared with the natural paper.

In addition, Nisshinbo Industries, Inc. uses a surface treatment on the synthetic paper made of polypropylene, polyvinyl chloride, polystyrene or polyester film with or without orientation, although the characteristics (printability, drying property) of the resulted synthetic paper are much better than the above-mentioned synthetic paper made of polypropylene uniaxially orientated film containing inorganic salt fine powder as a paper-like surface layer, it should widely replace the cultural use of the natural paper, in fact, the manufacturing costs of this synthetic paper are quite high in various aspects, its sales in the market are not more ideal than the synthetic paper made of the polypropylene uniaxially orientated film containing inorganic salts fine powder as a paper-like surface layer, because its technology includes the use of DMF (Dimethyl formamide) solvent as a surface layer treating agent, the paper surface layer thickness after the coating is quite thick, thus the coating thickness is not less than 10 μm, the toxicity of the solvent is very strong, and the coating material hardens during processing, also an expensive wastewater treatment equipment is needed to be invested to treat the large volume of toxic waste water by-product in the foaming phase, otherwise it will cause environmental pollution problems.

For wide application of the synthetic paper to replace quality-wisely the use of the natural paper, meanwhile also avoiding the application scope narrower due to excessively high manufacturing costs, 15 years ago before the present invention application, the present applicant also provided a polypropylene resin composition through the co-extrusion of one primary extruder and two secondary extruders into the same T-die to make 3-layer polypropylene white opaque resin coated material sheet, and then after cooling, setting, biaxial orientation, corona treatment, the surface layer was coated with a paper-like surface processing agent containing inorganic salts in oily organic solvents (chlorinated polypropylene, benzene), depending on the thickness, to obtain a printing quick-drying type biaxial orientation polypropylene pearl shining synthetic paper of thickness 25~250 μm (U.S. Pat. No. 6,364,988, application Ser. No. 09/394,914). Please refer to the following table for different zone—patent applications:

| | |
|---|---|
| European Patent Application | 97110804.8 filed Jul. 1, 1997 |
| U.S. patent application Ser. No. | 09/131,833 filed Aug. 10, 1998 |
| Japanese Patent Application | 9-366839 filed Dec. 26, 1997 |

Because the microvoid volume and the porosity connection degree of the synthetic paper obtained by this invention are very close to those of natural paper products, thereby the drying time of the four-color printing ink is 10 minutes, while the drying time of the printed ink on the outer layer for avoiding the undersized reverse printing is less than one minute, so that the printing operation is entirely the same as that of natural papers, and the stacking volume control, printing plant workers increase and the waiting time for the drying operation are not necessary, besides, the ink absorbed is confined to the coating layer and does not invade into the substrate layer, therefore a general natural paper printing ink can be used; meanwhile its ink printing amount is similar to that of the natural paper, the ink volume put in the printing machine is not increased. It is thus clear that the qualities of the said inventive synthetic paper are beyond those of the generally known synthetic paper, and can widely replace the natural paper in the cultural paper application for printing and writing.

However, in the above applicant's invention, the inorganic salt compounds in the paper-like surface processing agent not only contain toxic chlorinated polypropylene, organic solvent benzene coating formulations, but also the synthetic paper process inevitably includes a 10~25M drying oven equipment at temperature of 80° C.~120° C., thereby, not only the plant and operating personnel, exposed to the solvent emission pollutants due to dryning, and industrial safety concerns this synthetic paper still contains residual traces of chlorine, benzene, for which the present applicants should re-rack their brains, conduct numerous experiments, review and improve, finally found that a biaxially orientated white opaque polypropylene three-layer structure substrate film (middle layer) is produced by one primary extruder using a resin composition composed of 90~40% by weight of high crystallinity polypropylene with more than 97% isotacticity, 10~40% by weight of calcium carbonate composite particles (45~85 weight % calcium carbonate and 55~15 weight % polypropylene resin), 0.1~15% by weight of titanium dioxide composite particles(40~60 weight % titanium dioxide and 60~40 weight % polypropylene resin), 0.1~5% by weight of antistatic agent, and 0.1~2% by weight of ultraviolet absorber; on the upper surface and the lower surface of the middle layer are co-extruded with the resin composition composed of 50~99% polyethylene and 0.1~5% anti-blocking agent by two secondary extruders, three extruders coextrude the molten material into the same T-type die to form a three layer coated material sheet, after the biaxial orientation and the corona treatment, a paper surface processing agent composed of 8~20% by weight of acrylic resin, 20~60% by weight of calcium carbonate, 0.1~5% by weight of clay, 0.1~2% by weight of titanium dioxide, 30~90% by weight of water and 0~2% by weight of antistatic agent is coated with a gravure coating roller to form a coating thickness less than 10 μm, resulted in a printing quick-drying environmentally friendly biaxially orientated polypropylene synthetic paper, and thereby the target of the present invention is realized.

SUMMARY OF THE INVENTION

The purpose of the present invention is to provide a quick-drying print and environmental-friendly biaxially orientated polypropylene synthetic paper and process of making the same.

To achieve the above objective, the present invention provides the process to produce a quick-drying print and environmental-friendly biaxially orientated polypropylene synthetic paper, including:

1) a resin composition composed of 90~40% by weight of high crystallinity polypropylene with isotacticity above 97%, 10~40% by weight of calcium carbonate composite particles, 0.1~15% by weight of titanium dioxide composite particles, 0.1~5% by weight of antistatic agent, and 0.1~2% by weight of ultraviolet absorber and a resin composition composed of 50~99% by weight of polypropylene and 5~0.1% by weight of anti-blocking agent, are extruded through one twin-screw primary extruder and two twin-screw secondary extruders respectively, at same temperature set at 200~280° C., and convergently flow into the same T-die to co-extrude a three-layer structure coated substrate film;

2) the resulted film is cooled and shaped on a 15~80° C. cooling roll, at first warmed-up, longitudinally stretched 4~6 times at 100~160° C., annealed, and then again preheated, laterally orientated 5~10 times at temperature set at 150~190° C., and annealed;

3) and then a power 20~150 KW high-frequency corona discharges to obtain the coated substrate film having thickness below 250 μm, wherein;

4) a paper-like surface processing agent composed of 8~20% by weight of acrylic resin, 20~60% by weight of calcium carbonate, 0.1~5% by weight of clay, 0.1~2% by weight of titanium dioxide, 30~90% by weight of water, 0.1~2% by weight of anti-static agent is coated to have a thickness less than 10 μm on the sheet surface via a 100~400 mesh, 60~10 μm engraving depth gravure coating roll, finally the paper obtained is passed through a 10~25M oven equipment at temperature 80~120° C. to acquire a synthetic paper having the thickness below 250 μm.

DESCRIPTION OF SYMBOLS AND NUMBERS IN THE DRAWINGS

Figure 1:
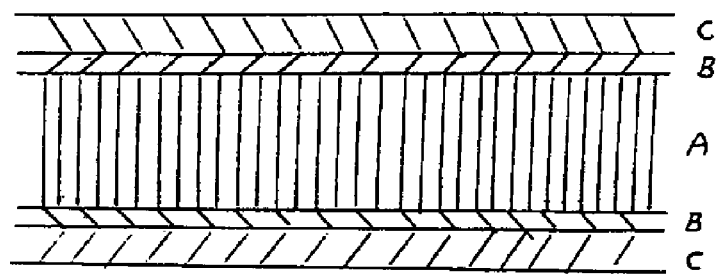
FIG. 1 is a cross-section structure diagram of the synthetic paper in accordance with the present invention.

In FIG. 1: "A" is the lower density foam layer: "B" is the paper-like surface processing agent bonding layer; and "C" is the paper-like layer for printing ink absorption.

Figure 2:
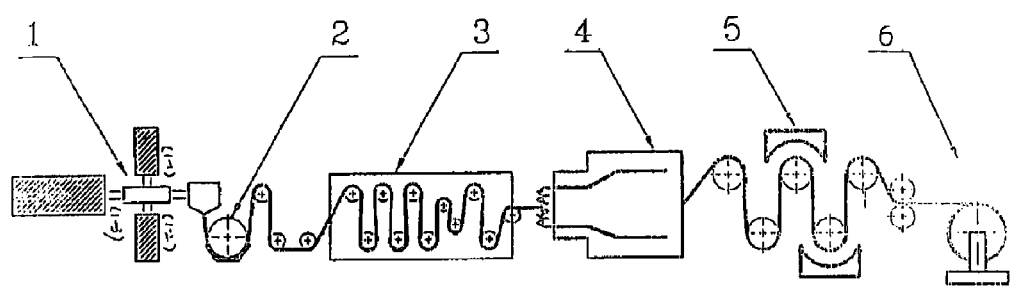
FIG. 2 is a schematic flow chart of the present inventive synthetic paper manufacturing equipments and process.

In FIG. 2: No. 1 is the extruder; No. 2 is the cooling molding device; No. 3 is the longitudinal orientation device; No. 4 is the lateral orientation device; No. 5 is the corona treatment device; and No. 6 is the winder.

Figure 3:
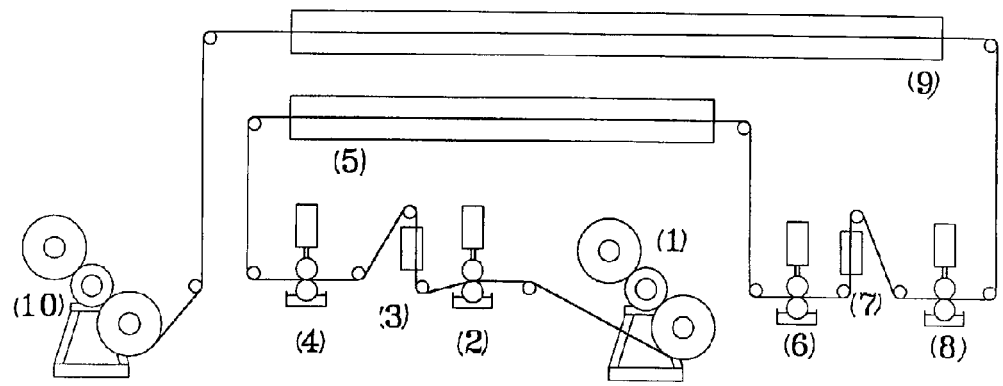
FIG. 3 is a schematic diagram of the inventive paper-like surface processing unit.

In FIG. 3: (1) coating distribution zone; (2) gravure coating roll (first printing plate); (3) drying equipment inbetween printing plates; (4) gravure coating roll (second printing plate); (5) lower drying oven; (6) gravure coating roll (third printing plate); (7) drying equipment inbetween printing plates; (8) gravure coating roll (fourth printing plate); (9) upper drying oven; and (10) winder.

Figure 4:
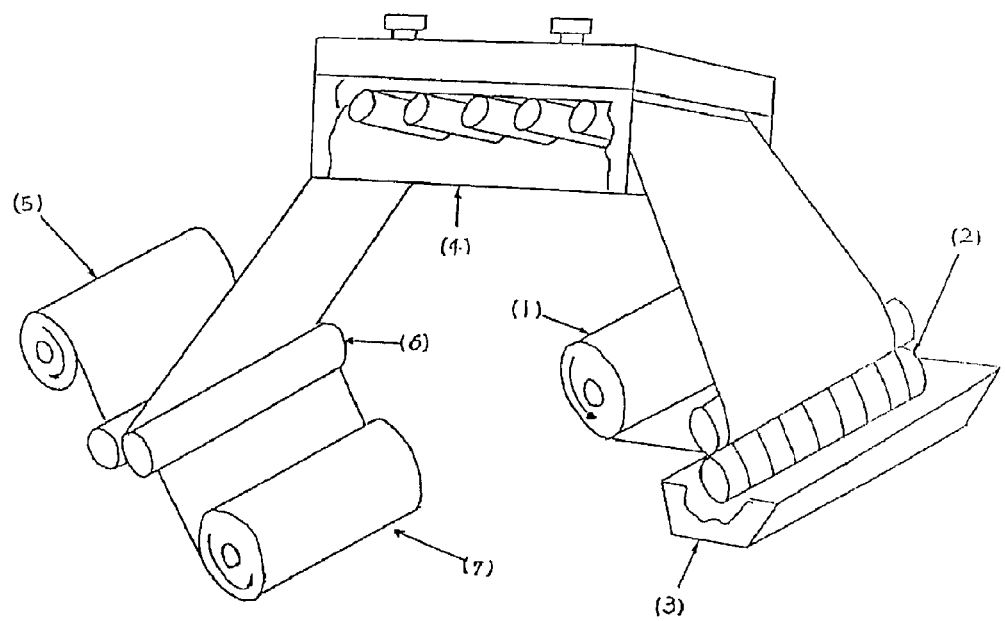
FIG. 4 is a schematic diagram of the present inventive laminating unit.

In FIG. 4: (1) glue distribution zone; (2) gravure coating roll; (3) glue tank; (4) drying oven; (5) lamination distribution zone; (6) lamination roll; (7) winder.

DETAILED DESCRIPTION OF THE PREFERRED EMBODIMENT

EXAMPLES

To be suitable for the eco-friendly cultural paper application in writing, printing, and food packaging, in the present invention, a high crystallinity polypropylene resin having isotacticity above 96% is used as the main raw material to manufacture coated substrate film, wherein polypropylene resin is selected from a high crystallinity cis-configuration (isotacticity) homopolymer with melt flow index (hereinafter abbreviated as MFI) of 2~6 (230° C./2.16 Kg load according to ASTM D1238), a copolymer with propylene as the main ingredient and α-olefin, such as, ethylene, butene-1, hexene-1, heptene-1, 4-methyl pentene as comonomers. This copolymer is a random copolymer, and can also be a block copolymer with melt flow index (JIS K 7210; 230° C., 2.16 kg load)

of 0.5~50 g/10 min, crystallization degree (X-ray method) more than 20%, preferably 40~75%, melting point in the range of 140~190° C.

The coating materials used in the present invention includes:

(1) Calcium carbonate filler: its main role is to make fine pores in the coating film due to the irregular structure of the filler during the biaxial orientation process, thus significantly to lower the specific gravity of the coating film to to 0.55~0.83 without foaming agents, and to give excellent opacity to the coating film. To take into account on the dispersion of inorganic fillers, inorganic fillers and polypropylene resin can also be melt-kneaded into composite particles. In addition to calcium carbonate, other inorganic fillers, such as, diatomite, clay, calcium silicate, clay, etc. can also be used.

(2) Titanium dioxide is rutile titanium dioxide: its major role is in the adjustment of shading and UV protection enhancement of the synthetic paper.

(3) Antistatic agent is an antistatic agent used in the current biaxially orientated polypropylene (BOPP), is mainly primary~tertiary amines, since the electric charge migration of primary~tertiary amines can eliminate the electrostatic effect resulted from the coating process.

In order to prevent the film surface blocking during winding-up the coated material sheet, an antiblocking agent, such as, silica, etc., used in the existing biaxially orientated polypropylene film is needed. In addition, the coating substrate film has a three-layer structure, its upper and lower layers shows a better film surface quality due to better roll adhering during cooling process, and for improving shading and coating fastness of the coating material sheet, inorganic fillers such as calcium carbonate, titanium dioxide, clay, calcium silicate or clay, etc., can also be considered to be added to both upper and lower layers or only one of them.

(4) Polyethylene: its main role is used for heat sealing, meanwhile masterbatch (MB) made of melt-kneading polyethylene and PP facilitates the enhancement of the film shading property, thereby exhibits the paper-like appearance effect.

The present inventive paper-like surface processing agent includes:

1) Acrylic resin: its main function is to improve the adhesion between the coating layer and the substrate, paper-like surface rigidity and scratch resistance, in the meantime, also to show a great help to improve weatherability, but there is an option not to add acrylic resin for considering the paper softness.

2) Calcium carbonate and clay: their particle size range is from 0.5~5 μm, their main function is to improve the printing ink drying capacity. In addition, diatomaceous earth, calcium silicate, clay, kaolin or so can also be used as one of the raw materials.

3) Titanium dioxide: its main function is to provide the synthetic paper better whiteness and visual texture, moreover to give a great help for shading property and UV resistance of the synthetic paper.

4) Antistatic agent: it is a water-based complex compound antistatic liquid, the main ingredient thereof is amides, its main function is to eliminate the static electricity generated during the printing process, and to let the synthetic paper to be able to be printed with a laser printer.

In order to extend the durability of the synthetic paper for the outdoor use and to prevent ultraviolet radiation and aging decomposition of the synthetic paper, a small amount of UV absorbers is incorporated in the three-layer raw materials, the dosage thereof is 1~2% by weight.

The specific gravity of the present inventive improved quick-drying print and environmental-friendly biaxially orientated polypropylene synthetic paper products is as low as 0.55~0.83, which is lower than 0.79 of Japanese Publication No. 3-87255 by 24% or more, and is also lower than 0.85 of Nissinbo Co., Ltd. by 29% or more, so that consumers have more area to use and thereby more economical.

The invention is described in detail below with reference to the inventive improved process equipment flow diagram (drawings) to produce the quick-drying print and environmental-friendly biaxially orientated polypropylene synthetic paper.

FIG. 1 is a schematic cross-section structure diagram of the synthetic paper obtained by the present inventive improved process.

FIG. 2 is a schematic flow chart of the present inventive synthetic paper manufacturing equipments, wherein 1). No. 1 is an extrusion zone: including one twin-screw primary extruder and two twin-screw secondary extruders, operation temperatures thereof depend upon raw materials, MFI, crystallinity, viscosity, additives of the resin composition and the production line speed (winding speed), and usually are set within the range of 200~280° C. Three-layer co-extrusion is conducted, wherein three-layer materials are co-extruded from a T-type die.

2). No. 2 is a cooling shaping roll device: the high temperature 200~280° C. three-layer co-extrudate is cooled and shaped in the water-cooling or air-cooling device. Cooling temperature control of this process will have a great impact on the subsequent implementation steps and the successful process, while cooling temperature depends on the coated substrate film thickness and the production of line speed, the said temperature is usually adjusted in the range of 15~80° C.

3). No. 3 is the longitudinal direction (machine direction) orientation device: the cooled and set coated substrate film is preheated and softened at 100~160° C. (depending on the required manufactured coating film thickness and the production line-speed settings) before the film is fed into the orientation device, then it is low-speed and high-speed stretched in one or two stages in order to strengthen the longitudinal direction mechanical strength of the coated film, and then annealed and set, usually the longitudinal direction stretching ratio is set at 4 to 6 times.

4). No. 4 is a transverse direction (lateral orientation) orientation device: the above longitudinal direction orientated thinner coated substrate film is preheated and softened at 150~190° C. (depending on the required manufactured coating film thickness and the production line-speed settings), and then transverse direction stretched, and finally annealed, shaped and retracted to increase dimensional stability, and usually the transverse direction stretching ratio is set at 5 to 10 times.

5). No. 5 is a corona treatment device: it is used for the coated substrate film to improve the film surface qualities, to enhance the fastness between the coated substrate film surface and the paper-like surface processing agent, a 20~150 KW power high-frequency discharge device (adjusted depending on the production line speed) is used to achieve wetting tension of 38~48 dyne/cm$^2$.

6). No. 6 is a winder: a device including a tubular-type body which will take up the produced coated substrate film to become an 8M wide finished product.

FIG. 3 shows a surface layer treatment device: the surface layer treatment device can be used to coat each side or double-sides (on-line) of the coated substrate film having the thickness blow 250 μ produced by the device of FIG. 2 and the coated substrate film having the thickness higher than 300 μm produced by the lamination device of FIG. 4 to form a large microvoid volume and the porosity connection degree natural paper-like paper surface layer. A coated substrate film under or over 300 µm is put in the coating distribution zone (FIG. 3 (1)), then the paper-like surface processing agent is coated via a gravure coating roll (FIG. 3(2)) on the coated substrate film surface as the first single-sided paper-like treatment. The first single-side treated coated substrate film is passed through a 10~25M, temperature 80~120° C. oven equipment (FIG. 3 (3)) between the first and the second treating rolls, and then the second single-side paper-like surface processing is carried out with the second gravure coating roll (FIG. 3 (4)). Finally, it is dried in a 10~25M, temperature 80~120° C. oven equipment (FIG. 3 (5)). If double-side coating is needed, in analogy to the first single-side paper-like surface processing steps, the finished first surface coated substrate film is passed through the third gravure coating roll and a 10~25M, 80~120° C. temperature oven equipment (FIG. 3 (7)), finally the fourth gravure coating roll (FIG. 3 (8)) and into a 10~25M, 80~120° C. temperature oven equipment (FIG. 3 (9)) for the second surface coating and drying.

The above-mentioned device is a each side two coating plates single- or double-sided in-line coating machine, single- or double-sided paper-like coating is selected according to product applications, or one or two coatings on each side; the engraving depth of the gravure coating roll can be 10~60 µm; mesh size can be 100 to 400 mesh, wherein engraving depth and mesh size can be permutated and combined.

FIG. 4 is a multilayer laminating unit: the coated substrate films of the same or not the same two rolls having the thickness less than 200 µm are laminated; before lamination, the glue is coated on the layer surface respectively to let the thickness of the coated material sheets more than 300 µm. No. (2) in FIG. 4 is a glue coating roll, the type thereof (multi-lines shallow engraving or less-lines deep engraving) depends on the glue coating quantity and the viscosity of the adhesive primer. The adhesive primer suitable for polypropylene lamination includes polyurethane system or other polyethylene imide, ethyl imide adducts of polyamine polyamide or quaternary ammonium containing acrylate polymers.

Two rolls of synthetic paper coated substrate film with the same or different thickness below 250 µm are fed to the glue coating roll and lamination roll distribution zone (FIG. 4 (a) (5)) respectively, in glue coating distribution zone (FIG. 4(1)), the coating glue placed in the coating glue solution tank (FIG. 4 (3)) is coated on the coated substrate film via the gravure roll (FIG. 4 (2)), the glue coated substrate film is dried in a 40~80° C. drying oven (FIG. 4 (4)) to remove the solvent from the glue solution, and then the solvent removed coated substrate film is laminated with another coated substrate film having same or different thickness from another glue coating distribution zone (FIG. 4 (5)) via a 40~80° C. lamination roll (FIG. 4 (6)), the resulted laminated coated substrate film is winded up with a winder (FIG. 4 (7)), and the finished 300 µm or more coated sheet product is obtained.

Detailed Description of the Preferred Embodiment

In order that the inventive technical content disclosed herein may be further understood, examples are provided and described in detail below. It should be understood that these examples are for illustrative purposes only and are not to be construed as limiting the invention in any manner.

Example 1

The Double-Sided Printing Quick-Drying Environmentally Friendly Biaxially Orientated Polypropylene Synthetic Paper Having the Thickness Below 250 µm (1) 70% by weight of polyethylene (MFI: 2.7~3.3) with isotacticity above 97% and 3% by weight of polyethylene, 21% by weight of calcium carbonate composite particles (60%), 5% by weight of titanium dioxide composite particles (45%), and 4% by weight of antistatic agent are mixed and added into a primary extruder; in addition, 99% by weight of polypropylene, 1% by weight of an antiblocking agent are mixed in the mixer, then fed into two secondary extruders; under primary and secondary extruders temperature of 200~280° C., three polypropylene melts convergently flow into the same T-type die to co-extrude a three-layer coated material sheet, which is cooled and shaped on the cooling roll in the temperature range of 15~80° C., and then it is fed into longitudinal direction orientation device, first warmed-up at temperature set at 100~160° C., and stretched 4 to 6 times along longitudinal direction, thereafter annealed and cooled; cooled before entering the transverse direction orientation device, again preheated at temperature set at 150~190° C., stretched 5 to 10 times, then annealed and cooled to control the retraction ratio of the coated material sheet; left the transverse direction orientation device, and the substrate film is corona treated to endow the coated substrate film with better paper-like layer fastness, and resulted in a coated substrate film having the required thickness of 250 µm.

(2) the coated substrate film having the thickness of 68 µm is fed into the paper-like surface processing unit, and treated with a paper-like surface processing agent composed of 8~20% by weight of acrylic resin, 20~60 weight % of calcium carbonate, 0.1~5% by weight of clay, 0.1~2 weight of titanium dioxide %, 30~90 weight % of water, via the first gravure coating roll with 200 mesh and 30~40 µm engraving depth to coat 1~3 µm thickness layer as the first paper-like surface coating on the first surface, and then passed through a 10~25M, 80~120° C. oven drying equipment, after drying, a similar processing agent to the first one is coated via the second gravure coating roll with 150 mesh and 40~50 µm engraving depth to coat a 4~7 µm thickness layer as the second paper-like surface coating on the first surface, and again passed through a 10~25M, 80~120° C. oven drying equipment to dry completely and then the coating film with its first surface having two coating materials is sent into the third gravure coating roll with 200 mesh and 30~40 µm engraving depth, the third coating of the second surface is conducted the same way as the first processing agent coating, it is passed through an 80~120° C. oven drying equipment, after drying, then the fourth coating of the second surface is conducted with a gravure roll having 150 mesh and 40~50 µm engraving depth, similar to the first processing agent coating except that the solid content is adjusted up to 55~65%, thereby to complete the fourth coating of the second surface, and then it is fed to a 10~25M oven equipment to dry completely at 80~120° C., the resulted coating exhibits excellent easy-drying printability, the printed outer layer can be dried within about 1 minute, and all printed outer layers are completely dried within 10 minutes. The resulted 80 µm two-sided printing quick-drying environmentally friendly biaxially orientated polypropylene synthetic paper is widely used for writing, printing, packaging, and various uses of the cultural paper. The characteristics of the synthetic paper manufactured according to the above steps are shown in Table 1.

Example 2

Two-Sided Printing Quick-Drying Environmentally Friendly Biaxially Orientated Polypropylene Synthetic Paper Having a Thickness Above 300 μm 168 μm an 170 μm basic coated material sheets are taken, and put in a gluing and lamination distribution zone (FIG. 4 (a) (5)) of a lamination device (FIG. 4) respectively, the 168 μm basic coated substrate film in the gluing distribution zone (FIG. 4 (1)) is coated by the coating liquid in the liquid coating agent tank (FIG. 4 (3)) via a a gravure roll (FIG. 4 (2)) having 175 lines and 35 μm engraving depth; the 168 μm coated substrate film is passed through a 10 meter long drying oven (FIG. 4 (4)) at drying temperature of 40~80° C. to get rid of the solvent in the coating agent solution, then the 168 μm coated substrate film without the solvent is fed to a 40~80° C. lamination roll (FIG. 4 (6)) to be laminated with another 170 μm coated substrate film from another lamination distribution zone (FIG. 4 (5)), The resulted 338 μm coated substrate film is taken-up on the winder as a 338 μm coated substrate film to be treated on paper-like surface processing unit. In the same way as Example 1, except that 6 μm of the coated thickness is changed to be 2 μm thickness on each side of the surface layer via the surface processing unit, the paper paper-like surface of the resulted 350 μm double-sided printing quick-drying environmentally friendly biaxially orientated polypropylene synthetic paper exhibits excellent printing resolution and easy-drying printability. The characteristics of the synthetic paper obtained according to the above steps show in Table 1.

TABLE 1

| Physical properties | | Example 1 80 μm | Example 2 350 μm |
|---|---|---|---|
| Specific gravity, g/cm² (ASTM D792) | | 0.86 | 0.70 |
| whiteness % (TAPPI T-525) | | 93 | 93 |
| opacity % (TAPPI T-425) | | 89 | 98 |
| gloss % (TAPPI T-480) | | 21 | 21 |
| coefficient of friction (ASTM D-1894) | | 0.40 | 0.48 |
| tensile strength kg/mm² (ASTM D882) | MD | 117 | 88 |
| | CD | 220 | 147 |
| % elongation at break | MD | 120 | 145 |
| | CD | 45 | 40 |
| (ASTM D882) the drying time for printing the outer layer | | in 1 minute | in 1 minute |
| completely dring time after printing | | in 10 minute | in 10 minute |

Remarks:
TAPPI—(Technical Association of Pulp and Paper Industry)
MD—machine direction (longitudinal direction)
CD—cross direction (transverse direction)

What is claimed is:

1. A process to produce a quick-drying print and environmental-friendly biaxially orientated polypropylene synthetic paper, including:
   1) a polypropylene resin composition comprising 90~40% by weight of a high crystallinity, isotacticity above 97% polypropylene resin, 10~40% by weight of calcium carbonate composite particles, 0.1~15% by weight of titanium dioxide composite particles, 0.1~5% by weight of antistatic agent, 0.1~2% by weight of UV absorbers and a resin composition comprising 50~99% by weight of polypropylene and 5~0.1% by weight of anti-blocking agent are fed into one twin-screw primary extruder and two twin-screw secondary extruders respectively at temperature set at 200~280° C. and convergently flow through the same T-die and co-extrude into a three-layer structure coated material sheet;
   2) after this three-layer structure coated substrate film is cooled and shaped on a 15~80° C. cooling roll, it is biaxially orientated, i.e. preheated, longitudinally stretched 4 to 6 times at 100~160° C., annealed, then preheated again, laterally stretched 5 to 10 times at temperature set at 150~190° C. and annealed;
   3) then the biaxially orientated sheet is treated with a 20~150 KW power high-frequency corona discharge to become a coated substrate film having a thickness below 250 μm, characterized in that:
   4) the resulted coated sheet is treated via a 100~400 mesh, 60 μm~10 μm engraving depth gravure coating roll with a paper-like surface processing agent composed of 8~20% by weight of acrylic resin, or 20~60% by weight of calcium carbonate, 0.1~5% by weight of clay, 0.1~2% by weight of titanium dioxide, 30~90% by weight of water, 0.1~2% by weight of anti-static agent, then passed through a 10~25M, temperature 80~120° C. oven equipment to procure the synthetic paper having a thickness below 250 μm.

\* \* \* \* \*